June 24, 1930. C. O. LAVETT 1,765,433
APPARATUS FOR CONTROLLING DENSITY OR VISCOSITY OF LIQUIDS
Filed Jan. 7, 1928 3 Sheets-Sheet 1

Inventor
Charles O. Lavett
By Pope + Powers
Attorneys

June 24, 1930.  C. O. LAVETT  1,765,433
APPARATUS FOR CONTROLLING DENSITY OR VISCOSITY OF LIQUIDS
Filed Jan. 7, 1928  3 Sheets-Sheet 2

Inventor
Charles O. Lavett
by Popp & Powers
Attorneys

June 24, 1930.  C. O. LAVETT  1,765,433
APPARATUS FOR CONTROLLING DENSITY OR VISCOSITY OF LIQUIDS
Filed Jan. 7, 1928  3 Sheets-Sheet 3
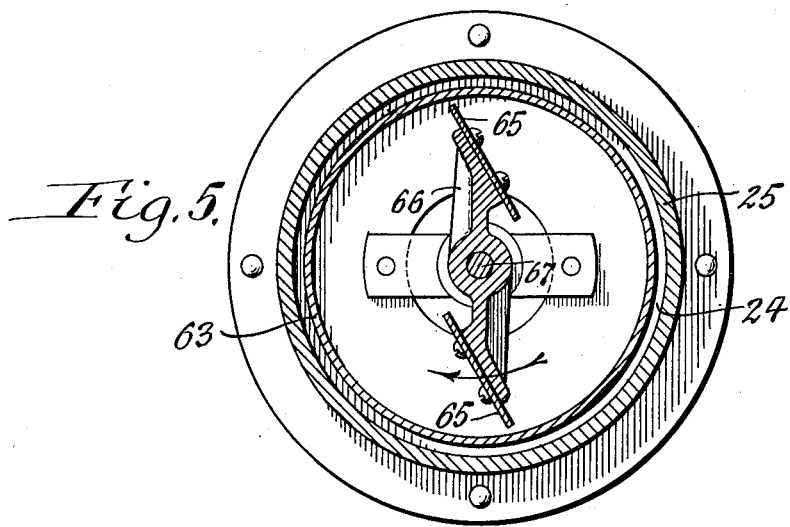
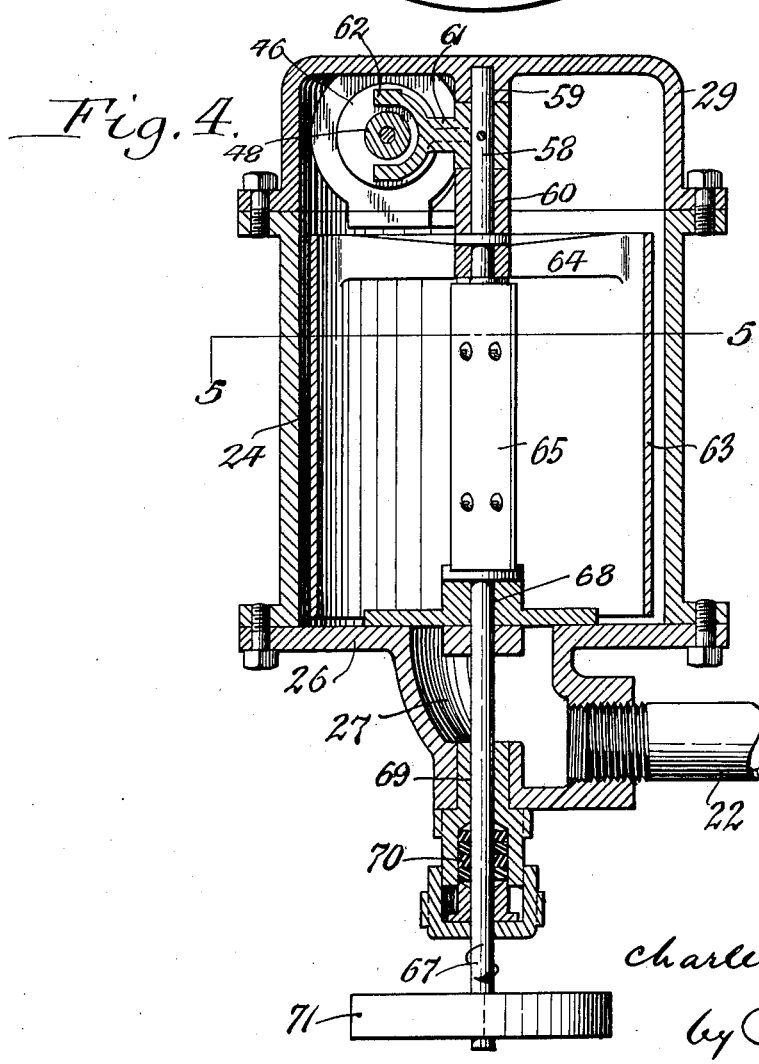
Inventor
Charles O. Lavett
by Popp & Powers
Attorneys Patented June 24, 1930

1,765,433

UNITED STATES PATENT OFFICE

CHARLES O. LAVETT, OF BUFFALO, NEW YORK

APPARATUS FOR CONTROLLING DENSITY OR VISCOSITY OF LIQUIDS

Application filed January 7, 1928. Serial No. 245,134.

This invention relates to an apparatus for automatically controlling the flow of liquids while the same are undergoing concentration and permit the same to discharge upon reaching the desired density or viscosity, such an apparatus being useful, for example, in a process whereby continuous evaporation or concentration is effected for mixing, blending or otherwise treating various liquids until a solution of uniform consistency or density is obtained.

The object of this invention is the production of an apparatus for this purpose which is simple in construction, efficient in operation and capable of being readily adjusted to secure the desired density of various kinds of liquids.

Figure 1:
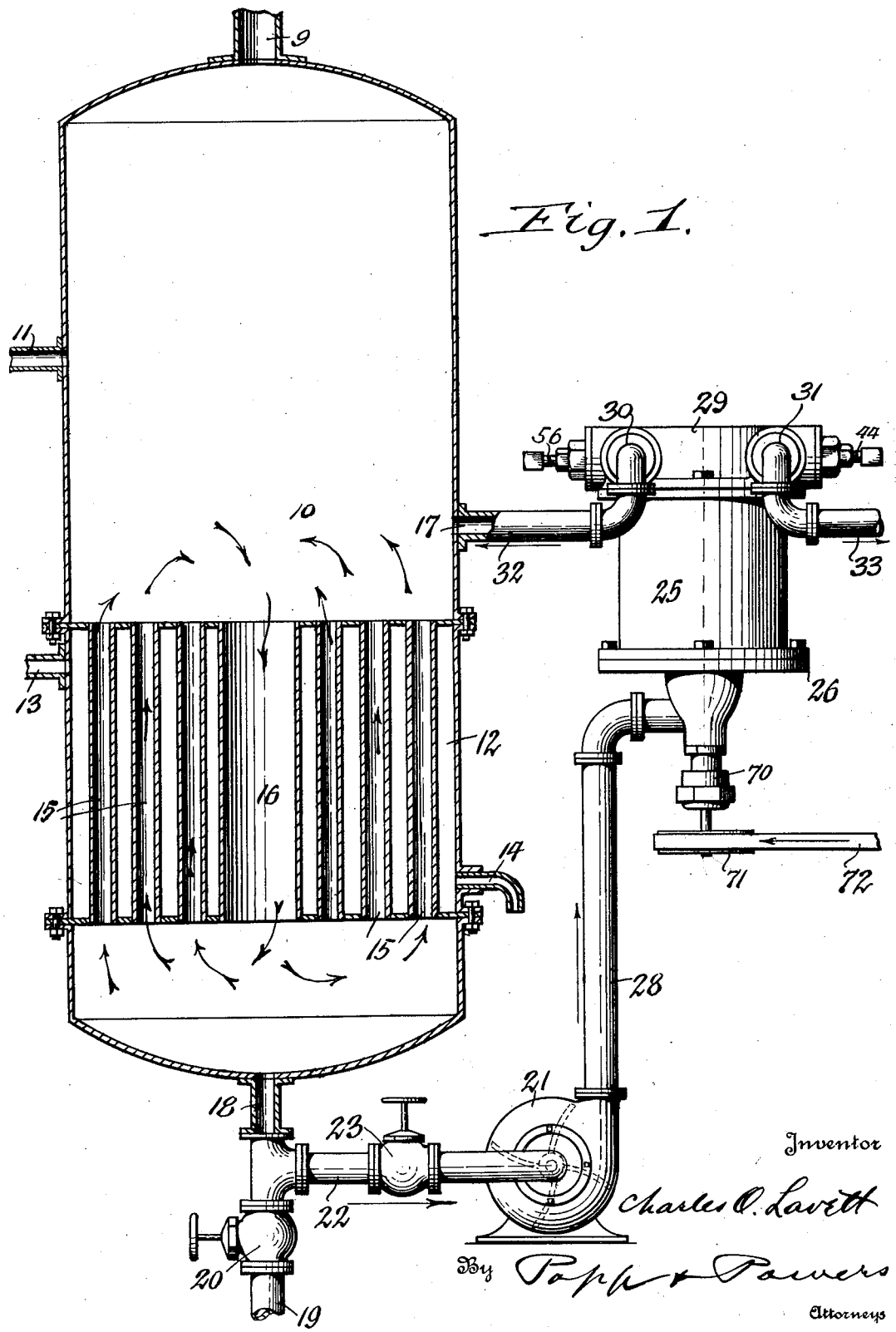
Figure 3:
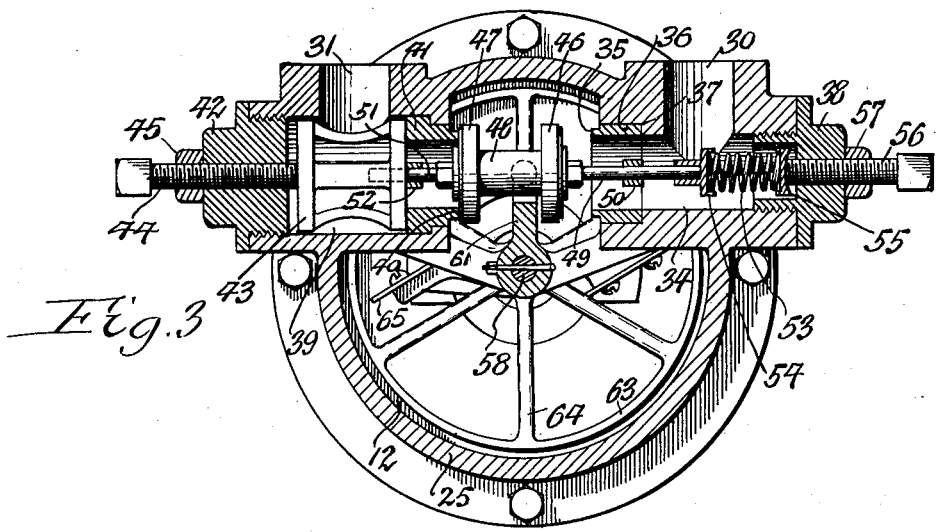
Figure 2:
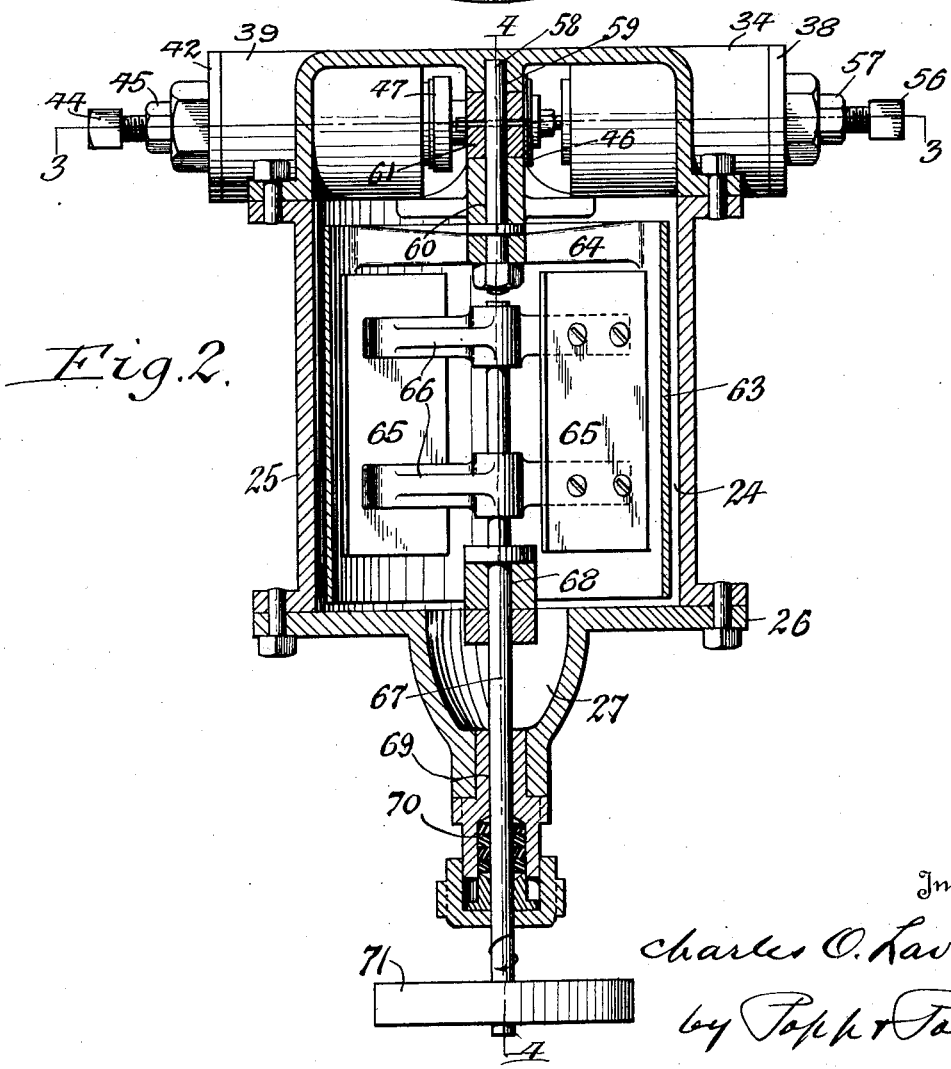

In the accompanying drawings:

Figure 1 is a side elevation of a practical embodiment of this invention showing the same installed in connection with a liquid evaporator or concentrator, which is shown in section, and a liquid circulating pump which is shown in elevation. Figure 2 is a vertical section, on an enlarged scale, of the apparatus for automatically controlling the discharge of the liquid upon reaching the desired density. Figure 3 is a horizontal section taken on line 3—3, Fig. 2. Figure 4 is a vertical section taken on line 4—4, Fig. 2. Figure 5 is a horizontal section taken on line 5—5, Fig. 4.

Similar characters of reference indicate like parts in the several figures of the drawings.

The liquid density controlling apparatus is combined with a mixer condenser, concentrator or evaporator, and means for circulating the liquid, both of which may be of any suitable or approved construction. The evaporator shown in the drawings, as an example, of one suitable for the present purpose, consists of an evaporating chamber 10 adapted to be supplied by a feed pipe 11 with the liquid to be concentrated, and with a vapor outlet 9 through which the vapors from the liquid are conducted to a condenser, a heating chest 12 arranged in the lower part of the chamber and adapted to be supplied by a pipe 13 with a heating medium such as steam and a discharge 14 through which the spent heating medium or water of condensation escapes, uptake heating flues or tubes 15 arranged inside of the heating chest and adapted to expose small parts of the liquid to be concentrated to the effects of the heating medium and to conduct the same from the lower to the upper part of the evaporating chamber, a downtake tube 16 arranged in the center of the heating chest and adapted to carry the liquid to be concentrated from the upper to the lower part of the chamber, a circulating inlet 17 for the liquid to be further concentrated communicating with the evaporating chamber above the heating chest, a circulating outlet 18 for liquid opening into the evaporating chamber below the heating chest, and a drain pipe 19 communicating with the chamber and containing a drain valve 20.

The means for circulating the liquid to be treated may be of various forms, that shown in the drawings, Fig. 1, consisting of an ordinary rotary pump having the eye of its casing 21 connected with the outlet 18 of the evaporating chamber by a pipe 22 containing a valve 23.

Between the peripheral outlet of the pump casing 21 and the liquid circulating inlet 17 the apparatus is interposed which embodies the present invention and which is constructed as follows:

The numeral 24 represents a liquid traction chamber through which the liquid under treatment is adapted to flow from the circulating outlet to the circulating inlet of the evaporator and which may be of any suitable form and arrangement but in the present case is formed within an enclosing casing having an upright cylindrical body or side wall 25, a lower head 26 applied to the lower end of said body and having a liquid inlet 27 which is connected by a pipe or conduit 28 with the outlet of the circulating pump, and an upper hollow head 29 applied to the upper end of the body and provided with an outlet 30 for the liquid which is continued in circulation and an outlet 31 for the liquid which is discharged upon reaching the desired degree of density, these outlets being arranged on opposite sides of the center of the upper head and the circulating outlet being connected by a pipe 32 with the circulating inlet 17 of the evaporating chamber and the discharge outlet 31 being connected with a pipe 33 leading to the place intended to receive the liquid having the required density.

The circulating outlet communicates at its inner end with a tube 34 which is provided at its inner end with a valve seat 35 formed on a ring 36 seated in an inwardly facing rabbet 37 in the bore of the inner part of this tube, and the outer end of this tube being closed by a cap 38 which is preferably connected therewith by a screw joint, as shown in Fig. 3. The discharge outlet communicates with a tube 39 which is axially in line with the tube 34 and is provided at its inner end with a valve seat 40 formed on the inner end of a ring 41 which engages with an outwardly facing rabbet 41 in the bore of the inner part of the tube 39, and the outer end of the latter being closed by a cap 42 which is preferably connected therewith by a screw joint, as shown in Fig. 3. The tubes 34 and 39 are arranged axially in line and on one side of the axis of the traction chamber, and the seats 35 and 40 oppose each other. The ring 36 is held in place by friction, but the ring 41 is held in place by a skeleton shaped retaining bridge 43 engaging its inner end with the outer end of the ring 41, and a clamping screw 44 working in the cap 42 and engaging the outer end of the bridge and a jamb nut 45 for holding the screw in place.

The numeral 46 represents a valve movable toward and from the circulating outlet valve seat 35, and 47, is a valve movable toward and from the discharge outlet valve seat 40, said valves being movable bodily in unison which is preferably effected by a neck 48 connecting the same. These valves are guided in their movements by a stem one end 49 of which slides in a cross piece 50 on the ring 36 and the other end 51 sliding in a cross piece on the ring 41. These valves are yieldingly held in a position in which the valve 46 is open and the valve 47 is closed, this being preferably accomplished by a spring 53 arranged in the tube 34 and bearing at its inner end through an interposed disk 54 against the adjacent end 49 of the valve stem and through an interposed disk 55 against an adjusting screw 56 which latter works in the cap 38 and is provided with a jamb nut 57.

Arranged axially within the upper part of the traction chamber is a short driven shaft 58 which is journaled in bearings 59, 60 on the central part of the upper head. To this shaft is secured a rock or shifting arm 61 the outer end of which has the form of a fork 62 which straddles the neck 48 and is adapted to engage the inner side of the circulating outlet valve 46. Within the body of the traction chamber is arranged a fluid traction member 63 having preferably the form of a cylinder which is concentric with the body 25 but separated from the bore of the latter by an intervening annular space and extending nearly the full length of this body, as shown in Figs. 2, 3, 4 and 5. The lower end of the traction cylinder terminates at a distance from the bottom or lower head of the traction chamber and the upper end of this cylinder has a spider 64 which is connected with the lower end of the driven shaft 58.

Rotatable within the traction cylinder and preferably about a vertical axis concentric with this cylinder and the traction chamber is an impeller consisting preferably of two blades or paddles 65 arranged vertically within the traction cylinder on opposite sides of the axis thereof and preferably inclined or tangential so that the advancing sides of these blades or paddles upon being rotated will not only tend to sweep or carry the liquid in the traction chamber circumferentially around the same but also increase the centrifugal effect thereon and throw it radially outward against the bore of the traction cylinder. These paddles are mounted on the outer ends of cross arms 66 which are secured midway of their length to the upper part of an upright driving shaft 67. The latter is journaled in bearings 68, 69 on the lower head of the traction chamber and passes downwardly through a stuffing box 70 on this head. Below this stuffing box the driving shaft is provided with means for rotating the same, for instance, a driving pulley 71 to which motion is transmitted from any suitable source by a belt 72.

Assuming that the evaporator has been filled to the required height with the liquid to be evaporated, reduced in density, mixed or blended, and that the impeller is rotating at a predetermined speed, the operation of this apparatus for controlling the density of liquids in the evaporator is as follows:

At the beginning of the evaporating operation when the liquid under treatment is still comparatively unmixed, unblended and low in density the rotation of the impeller of the controlling apparatus exerts little or no effect on the traction member so that the same stands in substantially its retarded position and the circulating outlet valve 46 is open and the finished product outlet valve 47 is closed, as shown in Fig. 3. In this position of the parts the liquid circulating under the action of the pump flows from the outlet of the latter, upwardly through the traction chamber and traction member, past the impeller paddles and open valve 46, out through the circulating outlet 30 into the upper part of the evaporator, thence downwardly through the downtake of the evaporator to the outlet at the bottom of the latter, and then back to the inlet of the pump. The liquid continues to circulate in this manner while the same is still below the required density. As the evaporation of the liquid proceeds and its viscosity or density gradually increases the forward rotation of the liquid in the traction cylinder and its centrifugal pressure against the latter under the action of the rotary impeller causes the liquid to gradually increase its frictional engagement or tractive grip on the bore of the traction cylinder and thereby drag this traction cylinder forwardly to an extent proportionate to the degree of viscosity of the liquid under treatment. When the liquid has reached the desired density or viscosity the tractive or dragging effect of the same on the traction cylinder under the action of the rotary impeller will be such that the traction cylinder is turned forwardly sufficiently to cause the shifting arm 61 to move the discharge valve 47 from its seat and the circulating valve 46 toward its seat to a greater or lesser extent, depending on the degree of viscosity of the liquid. When the valves 46, 47 are thus shifted more or less of the liquid in circulation which has reached the desired density or viscosity will leave the circulating stream and escape as finished product through the finished product discharge outlet 31 while the remainder of the stream of liquid discharges through the circulating outlet 30 and follows the stream of circulating liquid until ultimately it finds its way out of the finished product outlet 31 as the apparatus continues producing liquid of the required density or viscosity. When the liquid under treatment reaches a comparatively high degree of viscosity or density the tractive effect of the same on the traction member may be sufficient to close or nearly close the circulating outlet valve 46 and open the finish discharge valve 47 full or almost full, so that none or nearly none of the liquid escapes through the outlet 30 and all or nearly all of the liquid passes as finished product out through the outlet 31.

While this controlling apparatus is in operation and causing more or less of the finished product to be discharged, new or raw liquid may be constantly added to the evaporation through its feed pipe 11, so that the operation of evaporating the liquid and mixing or blending the same until it attains the desired density or viscosity, and the operation of automatically withdrawing the finished product may proceed continuously. It will thus be apparent that when this apparatus has been once set and the feed of raw liquid has been adjusted accordingly that it will evaporate the liquid until it reaches a predetermined uniform density or viscosity and will operate continuously without requiring samples of the liquid to be taken from the apparatus from time to time to determine its character, as has been the practice heretofore.

By adjusting the tension of the spring 53 the shifting of the valves 46, 47 by the liquid under treatment may be governed according to the degree of viscosity or density desired.

Although the foregoing describes the preferred embodiment of this invention it is to be understood that the same may be varied and still come within the purview of the essential features of novelty.

Obviously a weight may be used in place of the spring 53 for holding the valves 46, 47 yieldingly in a position in which the valve 46 is open and the valve 47 closed. The paddles may also vary in number, size and dimensions and may also be replaced by a cylinder of hexagonal or other form which would exert an agitating or impelling effect on the liquid. Moreover, the traction member which collects the energy of the liquid set into motion by the impeller may be replaced by one of different shape or form.

Furthermore, this apparatus can be operated in any position, either vertically as shown, or horizontally as well as at an angle, the essential requirement being that the shifting of the valves or other parts is dependent on the increased viscosity or density of the liquid under treatment.

It is to be understood that in the operation of this apparatus that only parts of the liquid in the evaporator are circulated by the pump and carried to the controlling device which automatically discharges some of the liquid when the same has reached the desired density or viscosity and that new or comparatively thin liquid is being supplied to the evaporator and mixed with the liquid already in a more or less dense or viscous condition at the same time that some of the liquid which has reached the desired density or viscosity is being discharged by the controlling device.

The operation of the apparatus is therefore continuous in that it constantly receives new liquid and discharges some of the finished product when the desired viscosity has been reached instead of operating on the liquid in batches which requires intermittent filling and emptying of the evaporator.

Obviously the evaporator can serve as a mixing chamber in which liquids of different density can be mixed or blended and at the same time circulated through the controlling device which automatically discharges a part of the liquid which has reached the desired density as a result of being mixed or blended.

I claim as my invention:

1. An apparatus for use in connection with an evaporator and controlling the density of a liquid which is being treated for increasing the density or viscosity of the same, comprising a chamber through which the liquid from a treating device is adapted to be circulated and which has a discharge for the finished liquid, operating means which are arranged within said chamber and which are responsive to variations in the density of the liquid in said chamber, and means which are actuated by said operating means and which control the delivery of the liquid issuing from said chamber so that when the liquid is very limpid the same is returned to the treating device, and when it has reached a predetermined density or viscosity it is discharged to another place.

2. An apparatus for controlling the density of a liquid which is being treated, comprising a chamber through which the liquid from a treating device is adapted to be circulated and which has a discharge outlet for the finished liquid and a circulating outlet for the liquid to be returned to the treating device, valves for controlling said outlets, and means responsive to variations in the tractive effect of the liquid passing through said chamber and operatively connected with said valves for shifting them and controlling said outlets.

3. An apparatus for controlling the density of a liquid which is being treated, comprising a chamber through which the liquid from a treating device is adapted to be circulated and which has a discharge outlet for the finished liquid and a circulating outlet for the liquid to be returned to the treating device, valve means for controlling said outlets, a rotary traction member immersed in the liquid within said chamber and operatively connected with said valve means, and a rotary impeller immersed in the liquid within said chamber adjacent to said traction member and adapted to move the latter by the tractive or dragging effect of the liquid between the traction member and said impeller.

4. An apparatus for controlling the density of a liquid which is being treated, comprising a chamber through which the liquid from a treating device is adapted to be circulated and which has a discharge outlet for the finished liquid and a circulating outlet for the liquid to be returned to the treating device, valve means for controlling said outlets, a cylindrical traction member immersed within the liquid within said chamber and operatively connected with said valve means, and a rotary impeller arranged within the cylindrical traction cylinder and adapted to move the latter by the tractive or dragging effect of the liquid between said traction member and said impeller.

5. An apparatus for controlling the density of a liquid which is being treated, comprising a chamber through which the liquid from a treating device is adapted to be circulated and which has a discharge outlet for the finished liquid and a circulating outlet for the liquid to be returned to the treating device, valves for controlling said outlets, a rock arm for shifting said valves, a driven shaft rotatably mounted within said chamber and connected with said arm, a traction cylinder immersed in the liquid within the chamber and connected with said driven shaft, a driving shaft rotatably mounted on the chamber and arranged within said cylinder, and paddles mounted on said driving shaft and adapted to cause the liquid in the chamber to press against the bore of said cylinder and drag the same circumferentially by friction.

6. An apparatus for controlling the density of a liquid which is being treated, comprising a chamber through which the liquid from a treating device is adapted to be circulated and which has an inlet, a circulating outlet adapted to be connected with the treating device and a discharge outlet for the finished product, said outlets having valve seats within said chamber, circulating and discharge valves controlling said outlets and movable toward and from said seats, yielding presser means for moving said valves in a direction for closing said circulating outlet and opening said discharge outlet, and means for shifting said valves having cooperating parts immersed in the liquid within the chamber and responsive to variations in the density or viscosity of the liquid.

7. An apparatus for controlling the density of a liquid which is being treated, comprising a chamber through which the liquid from the treating device is adapted to be circulated and which has an inlet, a circulating outlet adapted to be connected with the treating device and a discharge outlet for the finished product, said outlets having valve seats within said chamber, circulating and discharge valves controlling said outlets and movable toward and from said seats, yielding presser means for moving said valves in a direction for closing said circulating outlet and opening said discharge outlet, an adjusting device for said yielding presser means, and means for shifting said valves having cooperating parts immersed in the liquid within the chamber and responsive to variations in the density or viscosity of the liquid.

8. An apparatus for controlling the density of a liquid which is being treated, comprising a chamber through which the liquid from a treating device is adapted to be circulated and which has an inlet, a circulating outlet adapted to be connected with the treating device and a discharge outlet for the finished product, circulating and discharge tubes communicating with said outlets and arranged in line on one side of the axis of said chamber and having opposed circulating and discharge valve seats within said chamber, circulating and discharge valves movable toward and from said valve seats, a valve stem carrying said valves and guided in said tubes, a spring operating on said stem to move the same in the direction for closing the circulating valve and opening the discharge valve, an adjusting screw mounted on the chamber and bearing against the rear end of said spring, a driven traction member immersed in the liquid within the chamber and operatively connected with said valves, and a driving impeller movable in said chamber adjacent to said traction member and adapted to drag the latter by the frictional engagement of the liquid between them.

In testimony whereof I hereby affix my signature.

CHARLES O. LAVETT.